United States Patent
Roberts et al.

(10) Patent No.: US 8,992,774 B2
(45) Date of Patent: Mar. 31, 2015

(54) FLUME SYSTEM FOR A FILTER SYSTEM INCLUDING AT LEAST ONE FILTER HAVING A FILTER BED THAT IS PERIODICALLY WASHED WITH LIQUID, GAS OR A COMBINATION THEREOF

(71) Applicant: RG Delaware, Inc., Wilmington, DE (US)

(72) Inventors: R. Lee Roberts, Chadds Ford, PA (US); Mark Kevin Addison, Bear, DE (US); Andrew Scott Taylor, Warminster, PA (US); Jason Samuel Schmoyer, General Mills, PA (US)

(73) Assignee: RG Delaware, Inc., Wilmington, DE (US)

( * ) Notice: Subject to any disclaimer, the term of this patent is extended or adjusted under 35 U.S.C. 154(b) by 0 days.

(21) Appl. No.: 13/679,112

(22) Filed: Nov. 16, 2012

(65) Prior Publication Data
US 2013/0134086 A1    May 30, 2013

Related U.S. Application Data

(62) Division of application No. 12/457,061, filed on May 29, 2009, now Pat. No. 8,333,889.

(51) Int. Cl.
*B01D 29/66* (2006.01)
*B01D 24/24* (2006.01)

(52) U.S. Cl.
CPC ............... *B01D 29/66* (2013.01); *B01D 24/24* (2013.01)
USPC ............................ 210/274; 210/275; 210/293

(58) Field of Classification Search
CPC ..... B01D 24/24; B01D 29/66; B01D 24/4631; B01D 23/18
USPC ................................. 210/274, 275, 291, 293
See application file for complete search history.

(56) References Cited

U.S. PATENT DOCUMENTS

| | | |
|---|---|---|
| 2,378,239 A | 6/1945 | Myron |
| 3,831,761 A | 8/1974 | Chantereau |
| 4,191,652 A | 3/1980 | Whitmore |
| 4,214,992 A * | 7/1980 | Sasano et al. ................. 210/274 |

(Continued)

OTHER PUBLICATIONS

Search Report dated Aug. 25, 2010 issued by UK Intellectual Property Office in connection with corresponding UK patent application.

(Continued)

*Primary Examiner* — Matthew O Savage
(74) *Attorney, Agent, or Firm* — Merek, Blackmon & Voorhees, LLC

(57) ABSTRACT

A filter system having a filter bed for filtering water or wastewater, where the filter bed is periodically washed between service runs by directing washing liquid and washing gas upwardly through the filter bed. The filter system includes a filter bed and at least one flume. The flume is in fluid communication with the filter bed. Preferably, the flume is configured such that no washing liquid and washing gas interface is present in the flume. The flume may be configured such that during washing of the filter bed between service runs the flume receives a washing gas and directs the washing gas upwardly through the filter bed to assist in cleaning the filter bed between service runs. The flume may further be configured such that during washing the only liquid directed from the flume to the filter bed is residual liquid that may be present in the flume from a prior service run.

18 Claims, 12 Drawing Sheets

(56) References Cited

U.S. PATENT DOCUMENTS

| | | | |
|---|---|---|---|
| 4,435,286 A | | 3/1984 | Louboutin et al. |
| 4,604,197 A | | 8/1986 | Louboutin et al. |
| 5,019,259 A | | 5/1991 | Hambley |
| 5,108,627 A | * | 4/1992 | Berkebile et al. ............. 210/793 |
| 5,160,614 A | * | 11/1992 | Brown ........................ 210/793 |
| 5,296,138 A | * | 3/1994 | Walter ........................ 210/274 |
| 5,462,664 A | | 10/1995 | Neuspiel |
| 5,865,999 A | | 2/1999 | Shea et al. |
| 6,569,327 B2 | | 5/2003 | Roberts et al. |
| 6,740,237 B1 | | 5/2004 | Roberts et al. |
| 6,830,684 B2 | | 12/2004 | Stegge |
| 8,070,946 B2 | | 12/2011 | Roberts et al. |
| 8,333,889 B2 | | 12/2012 | Roberts et al. |
| 2008/0099412 A1 | * | 5/2008 | Roberts et al. ............... 210/793 |
| 2009/0071914 A1 | | 3/2009 | Roberts et al. |

OTHER PUBLICATIONS

Infinity Continuous Lateral Underdrain, 1999, Roberts Water Technologies, Inc. pp. 1 to 4.

Oct. 1, 2013 Office Action issued on corresponding UK patent application.

* cited by examiner

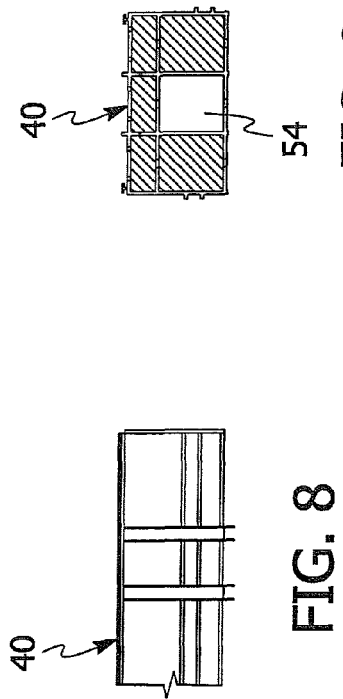
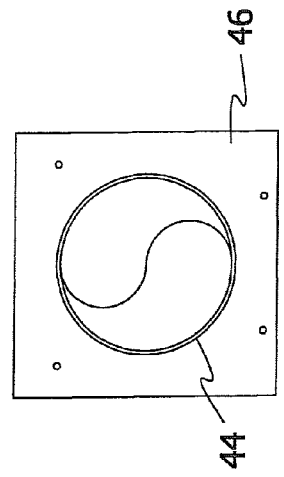
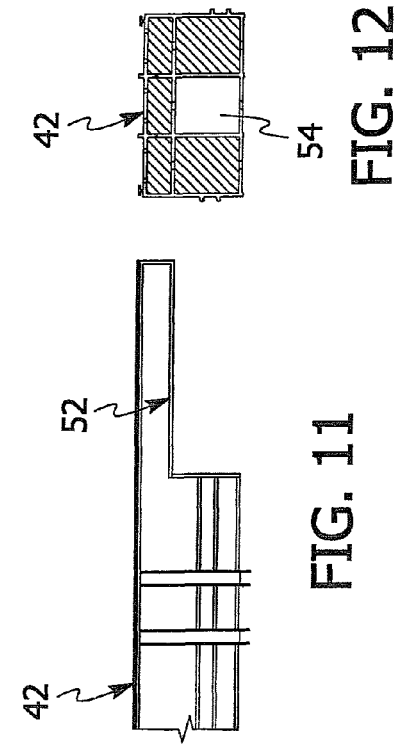
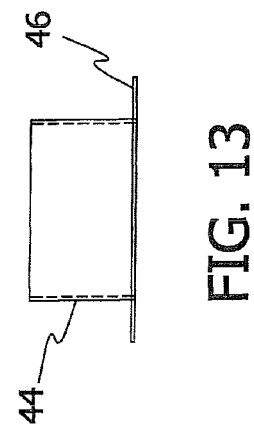

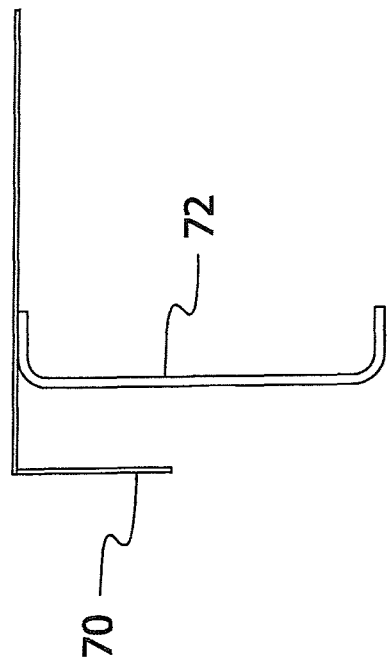
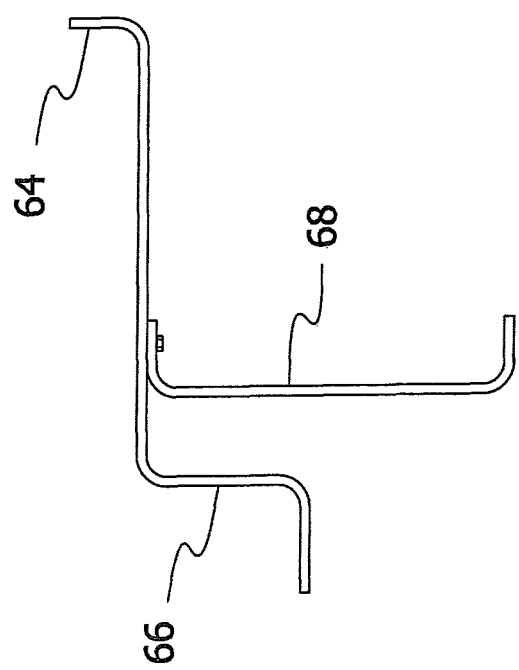

FLUME SYSTEM FOR A FILTER SYSTEM INCLUDING AT LEAST ONE FILTER HAVING A FILTER BED THAT IS PERIODICALLY WASHED WITH LIQUID, GAS OR A COMBINATION THEREOF

RELATED APPLICATION

The subject patent application is a divisional of U.S. patent application Ser. No. 12/457,061 filed on May 29, 2009, now U.S. Pat. No. 8,333,889, from which priority is claimed under 35 USC §120. The entire contents of U.S. patent application Ser. No. 12/457,061 filed are incorporated herein by reference.

FIELD OF THE INVENTION

The present invention is directed to a filter system having one or more filter beds that are periodically washed with a liquid, a gas and/or a combination of a liquid and a gas. Where a combination of a liquid and gas is used to wash the filter beds, the liquid and gas can be directed through the filter bed simultaneously or separately. More specifically, the present invention is directed to an improved flume system used in a filter system having one or more filter beds that are periodically washed with a liquid, a gas and/or a combination of a liquid and a gas. The present invention can be used in both water and wastewater applications.

BACKGROUND OF THE INVENTION

Filter beds formed from one or more layers of filter media have been employed in a variety of known filters for filtering water or wastewater to remove impurities from liquids. For example, filter beds of granular media have been used in upflow filters, downflow filters as well as other type of filters including bi-flow filters. After the filter has been operating for a while, it is necessary to wash the filter bed to remove the impurities trapped in the filter beds during the filtration mode. Various methods have been used to wash the filter bed including but not limited to the steps of: (i) liquid only wash; (ii) air only wash; (iii) liquid and air concurrently; (iv) liquid only followed by air only; (v) air only followed by liquid only; and, (vi) liquid and air concurrently followed by liquid only.

It is important that the washing fluid is thoroughly distributed through the filter bed during the washing mode in order to remove the impurities trapped in the filter bed during operation of the filter in the filtration mode. Various underdrains and flumes have been used in an attempt to distribute the washing fluids uniformly throughout the filter beds. Significant problems can be encountered by prior art devices. For example, a washing procedure that employs simultaneous liquid and air washing fluids is highly susceptible to mal-distribution of the washing fluids through the filter bed. Typically, in systems using this type of washing procedure, the filter bed is disposed above the underdrain. The underdrain often consists of a plurality of underdrain laterals placed in a side-by-side fashion. The underdrain laterals direct gas and liquid through the filter bed during the washing mode. The underdrain laterals are in fluid communication with a flume. The flume receives the washing fluids (i.e., washing gas and washing liquid) from their source and directs these fluids to the underdrain laterals. The washing gas/washing liquid interface in these flumes is often low, i.e., close to the bottom of the flume this is due to the properties of the washing gas (e.g., air) and their effect on the washing liquid including forcing the uppermost level of the washing liquid (e.g., filtered or unfiltered water) downwardly. This is undesirable as it limits the area available for the washing liquid resulting in relatively high liquid washing flow velocities down the length of the flume which in turn causes mal-distribution of the washing fluids to the underdrain and ultimately the filter bed.

One proposed solution to the low gas/liquid interface problem in the flume is to provide a flume with a bottom that is lower than the bottom of the filter bed. An example of this type of construction is shown in FIG. 3 of U.S. Pat. No. 6,312,611. Alternatively, separate members have been provided for conveying and distributing liquid and gas separately in an attempt to overcome the low gas/liquid interface problem. Examples of these types of devices are illustrated in FIGS. 4 through 7 of U.S. Pat. No. 6,312,611.

Another proposed solution to the low gas/liquid interface problem has been to provide at least one flume liquid metering orifice (i.e., a closed perimeter opening) in a particularly shaped baffle or stand-pipe. Examples of these structures are shown in FIGS. 10 through 20 of U.S. Pat. No. 6,312,611.

These designs still have significant problems. The washing liquid/washing gas interface still can lead to significant mal-distribution of the washing fluids in the filter bed. Further, where a flume has both a washing liquid and a washing gas present the area for each is limited by the area of the other.

OBJECTS AND SUMMARY OF THE INVENTION

An object of the present invention is to provide a novel and unobvious flume and filter system therefore.

Another object of a preferred embodiment of the present invention is to provide a filter system having a flume system that can readily accommodate different washing procedures including but not limited to: (i) liquid only wash; (ii) air only wash; (iii) liquid and air concurrently; (iv) liquid only followed by air only; (v) air only followed by liquid only; and, (vi) liquid and air concurrently followed by liquid only.

A further object of a preferred embodiment of the present invention is to provide a flume that eliminates washing gas/washing liquid interfaces in a flume.

Yet another object of a preferred embodiment of the present invention is to provide a flume system that dedicates a particular flume to either a washing liquid or washing gas flume to maximize the washing fluid that can be directed by the flume to the filter bed.

Still another object of a preferred embodiment of the present invention is to provide a flume system that includes a pair of flumes directing washing fluids to a single filter bed where one flume provides only a washing liquid and the other flume provides only a washing gas.

Yet still another object of a preferred embodiment of the present invention is to provide a flume system that includes at least one flume that is dedicated to providing only a washing gas to a filter bed where the flume is provided with means for quickly and thoroughly evacuating from the flume any residual liquid present in the flume from a prior service run (i.e., a filtration cycle).

Still yet a further object of the present invention is to provide a simple and effective method for converting a washing liquid only flume to a washing gas only flume.

Still another object of a preferred embodiment of the present invention is to provide a flume having a washing liquid compartment and a washing gas compartment without any washing gas/washing liquid interface in the flume.

It must be understood that no one embodiment of the present invention need include all of the aforementioned objects of the present invention. Rather, a given embodiment may include one or none of the aforementioned objects. Accordingly, these objects are not to be used to limit the scope of the claims of the present invention.

In summary, one embodiment of the present invention is directed to a filter system having a filter bed for filtering water or wastewater, where the filter bed is periodically washed between service runs by directing washing liquid and washing gas upwardly through the filter bed. The filter system includes a filter bed and a flume. The flume is in fluid communication with the filter bed. The flume is configured such that during washing of the filter bed between service runs the flume receives a washing gas and directs the washing gas upwardly through the filter bed to assist in cleaning the filter bed between service runs. The flume is further configured such that during washing the only liquid directed from the flume to the filter bed is residual liquid that may be present in the flume from a prior service run.

Another embodiment of the present invention is direct to a filter system having a filter bed for filtering water or wastewater, where the filter bed is periodically washed between service runs by directing washing liquid and washing gas upwardly through the filter bed. The filter system includes a filter bed and a first flume in fluid communication with the filter bed. The first flume is configured such that during washing of the filter bed between service runs the first flume receives a washing gas and directs the washing gas upwardly through the filter bed to assist in cleaning the filter bed between service runs. The filter system also includes a second flume that is in fluid communication with the filter bed. The second flume is spaced from the first flume. The second flume is configured such that during washing the second flume receives a washing liquid and directs the washing liquid upwardly through the filter bed to assist in cleaning the filter bed between service runs.

A further embodiment of the present invention is directed to a filter system having a filter bed for filtering water or wastewater, where the filter bed is periodically washed between service runs by directing washing liquid and washing gas upwardly through the filter bed. The filter system includes a filter bed and at least one underdrain lateral operably associated with the filter bed. The filter system further includes a flume. The flume is in fluid communication with the at least one underdrain lateral. The flume is configured such that during washing of the filter bed between service runs the flume receives a washing gas and directs the washing gas upwardly through the at least one lateral into the filter bed to assist in cleaning the filter bed between service runs. A conduit extends between the flume and the at least one underdrain lateral. The conduit has means for allowing a washing gas to be directed to the lateral while residual liquid remaining in the flume from a prior service run is simultaneously evacuated through the conduit.

Still another embodiment of the present invention is directed to a filter system having a filter bed for filtering water or wastewater, where the filter bed is periodically washed between service runs by directing washing liquid and washing gas upwardly through the filter bed. The filter system includes a filter bed and a flume. The flume is in fluid communication with the filter bed. The flume is configured such that during washing of said filter bed between service runs the flume receives a washing gas and directs said washing gas upwardly into the filter bed to assist in cleaning the filter bed between service runs. The flume has a baffle. The baffle is disposed such that the washing gas and residual liquid that may be present in the flume from a prior service run pass under said baffle to exit said flume.

Yet still another embodiment of the present invention is directed to a filter system having a filter bed for filtering water or wastewater, where the filter bed is periodically washed between service runs by directing washing liquid and washing gas upwardly through the filter bed. The filter system includes a filter bed and a flume. The flume is in fluid communication with the filter bed. The flume is configured such that during washing of the filter bed between service runs the flume receives a washing gas and directs the washing gas upwardly into the filter bed to assist in cleaning the filter bed between service runs. The filter system includes a sub-flume that is in fluid communication with the flume and the filter bed. The sub-flume is configured such that during washing of the filter bed between service runs the sub-flume receives a washing gas from the flume and directs the washing gas to the filter bed.

Still yet a further embodiment of the present invention is to directed to a filter system having a filter bed for filtering water or wastewater, where the filter bed is periodically washed between service runs by directing washing liquid and washing gas upwardly through the filter bed. The filter system includes a filter bed and a flume. The flume is in fluid communication with the filter bed. The flume is configured such that during washing of the filter bed between service runs the flume directs a washing gas and a washing liquid into the filter bed to assist in cleaning the filter bed between service runs. The flume includes a washing gas compartment separate from a washing liquid compartment such that no washing gas and washing liquid interface is present in the flume. A conduit extends between the washing gas compartment and the filter bed. The conduit is disposed relative to the washing gas compartment such that a lowermost portion of the conduit is disposed above a lowermost portion of the washing gas compartment.

Another embodiment of the present invention is directed to a filter system having a filter bed for filtering water or wastewater, where the filter bed is periodically washed between service runs by directing washing liquid and washing gas upwardly through the filter bed. The filter system includes a filter bed and a plurality of underdrain laterals disposed below the filter bed. A flume is in fluid communication with the filter bed. The flume is configured such that during washing of the filter bed between service runs the flume receives a washing gas and directs the washing gas upwardly through the filter bed to assist in cleaning the filter bed between service runs. At least a portion of the plurality of laterals forms at least one wall of the flume. At least one of the plurality of laterals has a length less than a length of at least one other of the plurality of laterals creating a space to receive a washing gas pipe for supplying washing gas to the flume.

A further embodiment of the present invention is directed to a filter system having a filter bed for filtering water or wastewater, where the filter bed is periodically washed between service runs by directing washing liquid and washing gas upwardly through the filter bed. The filter system includes a filter bed and a flume. The flume is in fluid communication with the filter bed. The flume is configured such that during washing of the filter bed between service runs the flume receives a washing gas and directs the washing gas upwardly through the filter bed to assist in cleaning the filter bed between service runs. The flume has an opening for permitting any residual liquid present in the flume from a prior service run to be evacuated from the flume without passing through the filter bed during washing of the filter bed with a washing gas.

BRIEF DESCRIPTION OF THE DRAWINGS

FIG. 8 is a fragmentary side view of that portion of one of the underdrain laterals adjacent the flume depicted in FIG. 5.

FIG. 9 is a right end view of lateral depicted in FIG. 8.

FIG. 10 is a plan view of the flume sealing plate and the washing gas supply pipe for the embodiment depicted in FIG. 5.

FIG. 11 is a fragmentary side view of that portion of another one of the underdrain laterals adjacent the flume depicted in FIG. 5.

FIG. 12 is a right end view of lateral depicted in FIG. 12.

FIG. 13 is a side view of the flume sealing plate and the washing gas supply pipe for the embodiment depicted in FIG. 5.

FIG. 15 is a side view of the sealing plate and baffle employed in the embodiment depicted in FIG. 14.

FIG. 16 is a side view of an alternative sealing plate and baffle that may be employed in the embodiment depicted in FIG. 14.

DETAILED DESCRIPTION OF THE PREFERRED EMBODIMENTS OF THE INVENTION

The preferred forms of the invention will now be described with reference to FIGS. 1-21. The appended claims are not limited to the preferred forms and no term and/or phrase used herein is to be given a meaning other than its ordinary meaning unless it is expressly stated otherwise. The term "washing liquid" as used herein does not include residual liquid present in the flume from a prior service run (i.e., a prior filtration cycle). In other words, residual liquid present in a flume from a prior service run is not washing liquid.

FIGS. 1 Through 4

Figure 1:
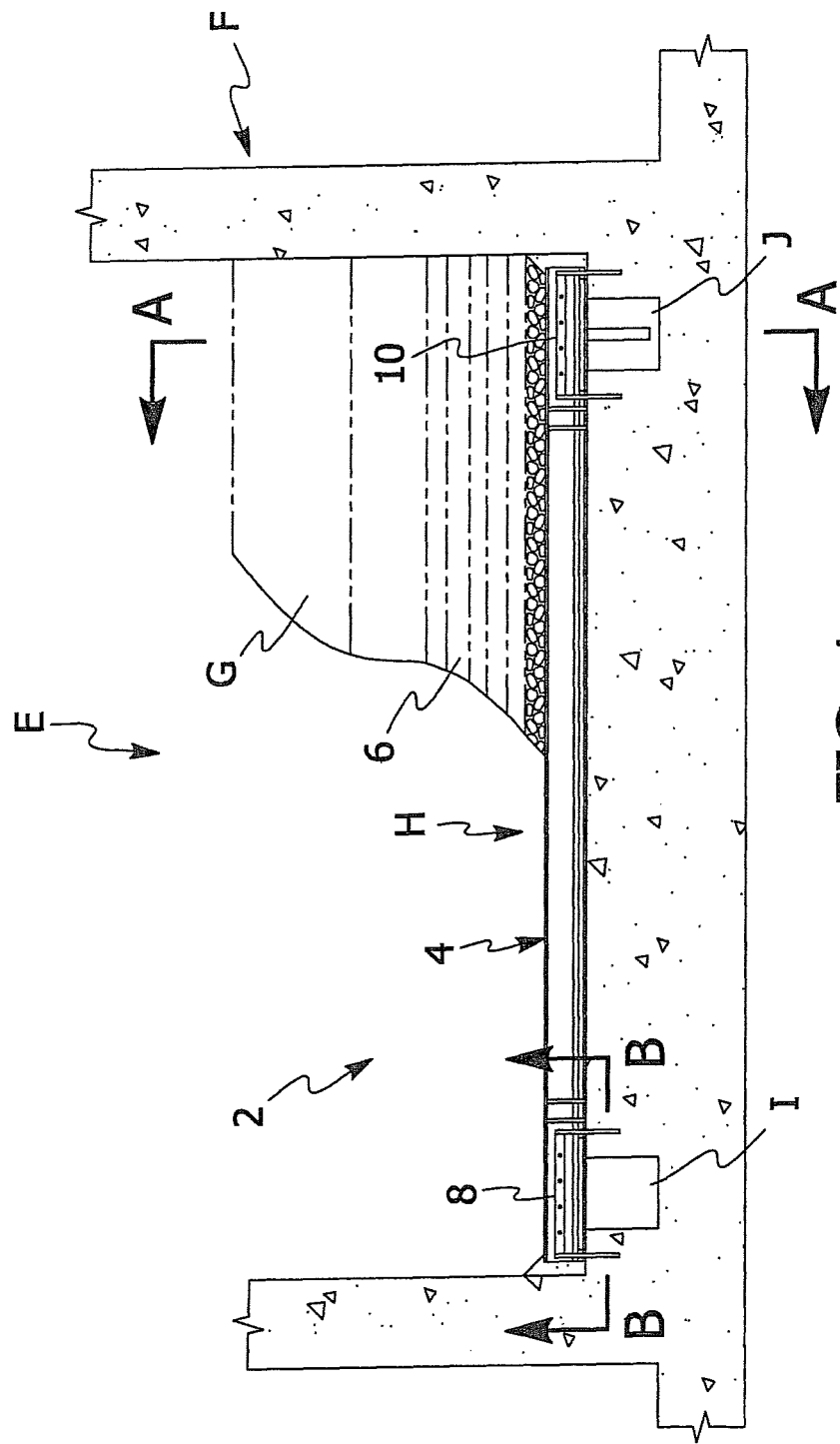
FIG. 1 is a fragmentary cross-sectional view of a filter system depicting one preferred embodiment of the present invention.

Referring to FIG. 1, a fragmentary portion of a filter system E employing a preferred form of the invention is illustrated in one of many possible configurations. Filter system E includes one or more filters F. Filter F can be a polishing filter or a roughing filter. Filter F can further be a downflow filter (i.e., in which influent to be filtered is directed downwardly through the filter bed during service runs) or an upflow filter (i.e., in which influent to be filtered is directed upwardly through the filter bed during service runs). Filter F includes a filter compartment 2 that houses a filter bed G, underdrain system H and flumes I and J. Filter compartment 2 is depicted as being formed from concrete. However, any suitable material may be used. The underdrain system H preferably includes a plurality of underdrain laterals 4 that are positioned in a side-by-side manner in the filter compartment 2. Grout is typically used to fill in any gaps between the underdrain laterals 4. Also, grout is typically used to fill in any gaps between the ends of the laterals and the corresponding walls of the filter compartment 2.

Filter bed G may be formed in any known manner. For example, the filter bed G can be formed of a single layer of granular media or multiple layers of granular media. The granular media can be of any suitable material including both synthetic material and naturally occurring material. Filter bed G may be supported by one or more gravel layers 6. Alternatively, underdrain system H may utilize a porous plate, slotted plate or other means operably connected to each underdrain lateral 4 to obviate the need for gravel support layers.

Flumes I and J, as depicted in FIG. 1, are recessed in the bottom of the filter compartment 2 and extend into the page as shown in FIG. 1 substantially the width of the filter compartment (i.e., the dimension of the filter compartment extending into the page as depicted in FIG. 1) Flume anchors 8 and 10 are located above the flumes I and J, respectively. The anchors 8 and 10 when covered with grout or other suitable material will prevent movement of the underdrain laterals 4 when fluids are directed upwardly out of flumes I and J. Preferably, during a washing cycle, the washing liquid is supplied by only flume I and the washing gas is supplied by only flume J.

Figure 2:
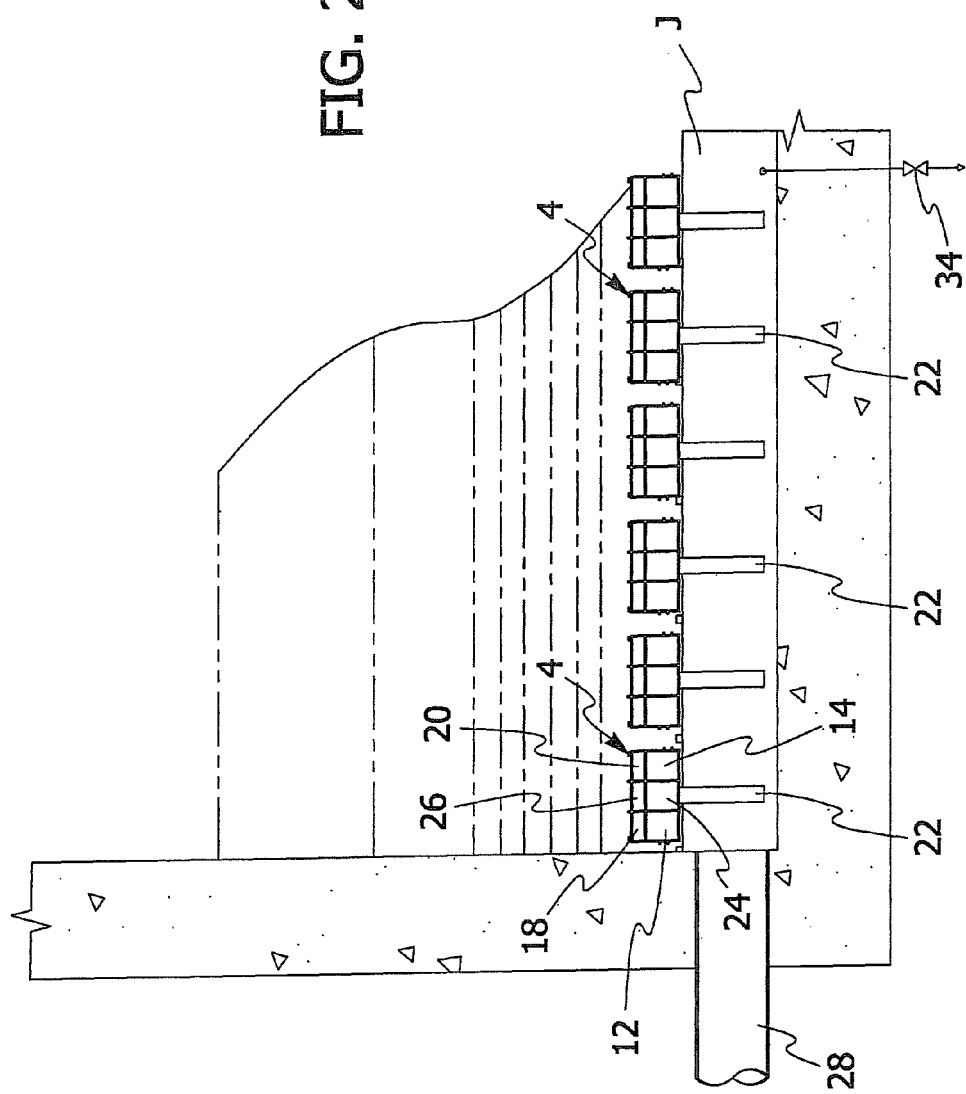
FIG. 2 is a fragmentary cross-section view taken along lines A-A in FIG. 1.
Figure 3:
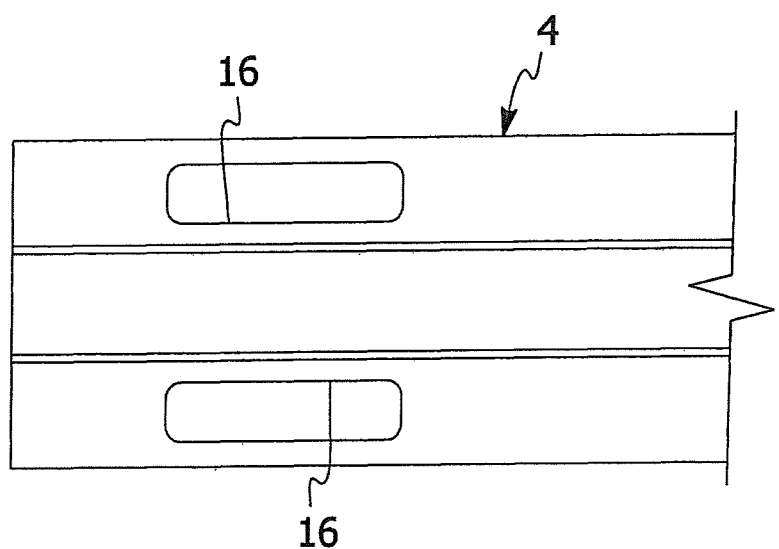
FIG. 3 is a fragmentary bottom view taken along lines B-B in FIG. 1 depicting the openings in the bottom of each of the plurality of underdrain laterals that allow washing liquid to enter the underdrain lateral.

During a service run, flume I will receive the effluent and direct the same through a conduit or piping system (not shown) to a desired storage location if the filter F is a downflow filter. If filter F is an upflow filter, effluent will be collected in a trough or other suitable device located above the filter bed G. During washing of filter bed G, a washing liquid is directed into flume I by any know means and directed through underdrain laterals 4 into the filter bed G to remove floc stored in filter bed G during service runs. The washing liquid can be supplied to flume I for all or only a portion of the washing cycle. As seen in FIG. 3, each underdrain lateral 4 preferably includes two vertical internal walls and one internal horizontal wall forming three lower chambers and three upper chambers. Referring to FIGS. 2 and 3, the outside lower chambers 12 and 14 have openings 16 formed therein directly above flume I so that the washing liquid will pass into chambers 12 and 14. Chambers 12 and 14 are in fluid communication with outside upper chambers 18 and 20, respectively so that the washing fluid may pass from the lower outer chambers to the corresponding upper outer chamber. A plurality of openings may be formed in the portion of the internal horizontal wall that separate the outer upper chambers from the corresponding lower outer chambers to allow liquid to pass between the corresponding chambers. Openings are formed in the top surface of underdrain laterals 4 to allow fluids to pass between the three upper chambers and filter bed G.

During a service run or shortly after the service run, liquid may collect in flume J. The residual liquid presents problems during a washing cycle. Specifically, during a washing cycle flume J directs a washing gas through underdrain laterals to assist in cleaning filter bed G. However, residual liquid obstructs the path of the washing liquid from the flume J to the filter bed G. This can cause a significant mal-distribution of the washing gas into the filter bed G. Accordingly, it is important to quickly and thoroughly evacuate the residual water from flume J.

Referring to FIG. 2, a lateral gas conduit 22 extends from each of the central lower chambers 24 of underdrain laterals 4 to a lower portion of flume J. Lower central chamber 24 is in fluid communication with upper central chamber 26 via openings formed in that portion of the internal horizontal wall separating chamber 24 from chamber 26. Upper chamber 26 is in fluid communication with the adjacent upper chambers 18 and 20 through openings formed in the two internal walls separating chamber 26 from chambers 18 and 20. Openings are also formed in the top surface of chamber 26 so that fluid may pass between chamber 26 and filter bed G.

During a washing cycle, a washing gas is supplied to flume J through supply conduit 28 for all or only a portion of the washing cycle. It should be noted that a washing gas may be supplied to flume J in a number of alternative ways including from the top as is shown in the embodiment illustrated in FIGS. 5 to 13. The washing gas forces any residual liquid in flume J through conduits 22 and corresponding chambers 24 and 26. By quickly and thoroughly evacuating residual liquid from flume J, the full volume of flume J is available for virtually the entire washing cycle to supply a washing gas and ensure proper distribution of the washing gas through filter bed G. It should be noted that some of the residual liquid may be directed into the filter bed through chambers 18 and 20. Preferably, the only liquid that escapes from flume J during any portion of the washing cycle is residual liquid that may have been present in flume J from the prior service run. It should be noted that during a washing cycle that uses simultaneous washing liquid and washing gas, the washing liquid will be directed through flume I only and the washing gas will be directed through flume J only. The washing gas and washing liquid will mix in chambers 18 and 20 of underdrain laterals 4.

Figure 4:
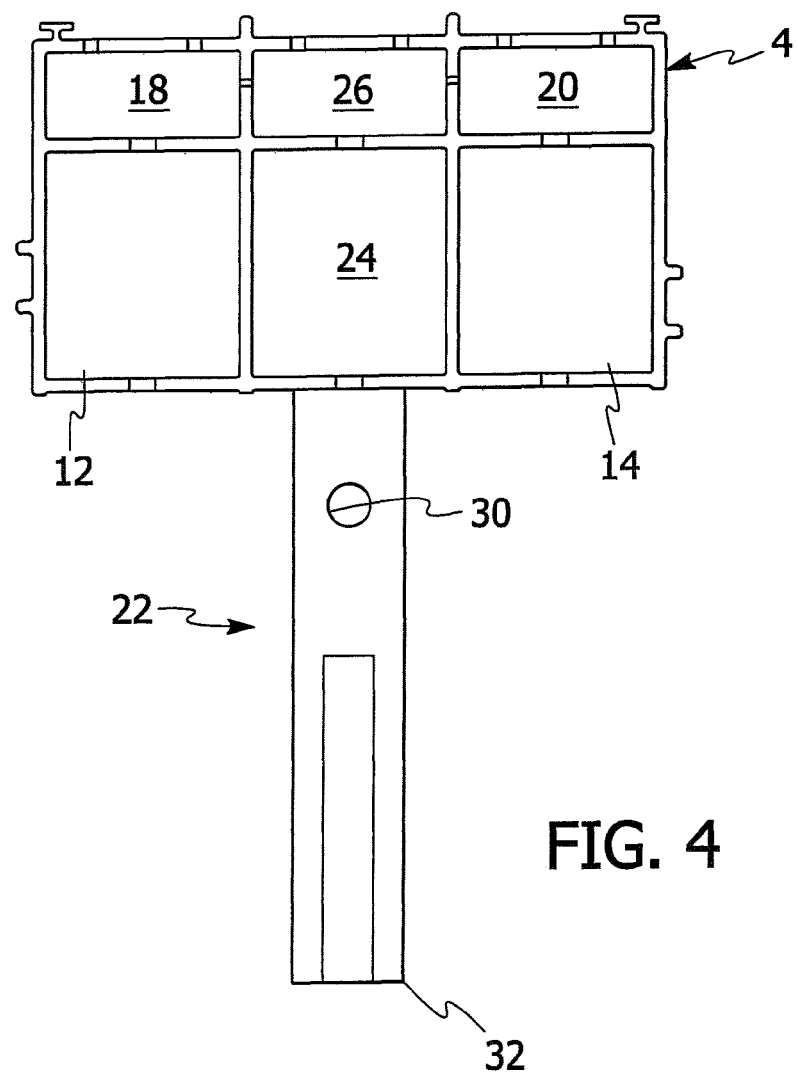
FIG. 4 is a fragmentary cross-section view taken through a preferred form of underdrain lateral and lateral gas pipe.

Referring to FIG. 4, conduits 22 can have an orifice 30 formed adjacent the upper end. This design is advantageous as it allows a washing gas to be directed to filter bed G while residual liquid enters the open bottom end 32 of conduit 22. A slot 36 may be formed in conduit 22 for the same reason, i.e., to allow a washing gas to be directed to filter bed G while residual liquid is being evacuated from flume J.

FIGS. 5 Through 13

Figure 5:
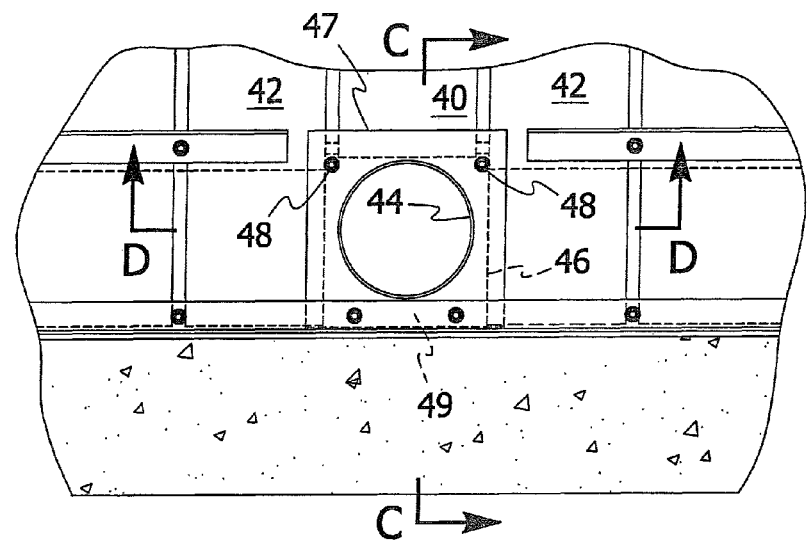
FIG. 5 is a fragmentary plan view of a filter system depicting another preferred embodiment of the present invention.
Figure 6:
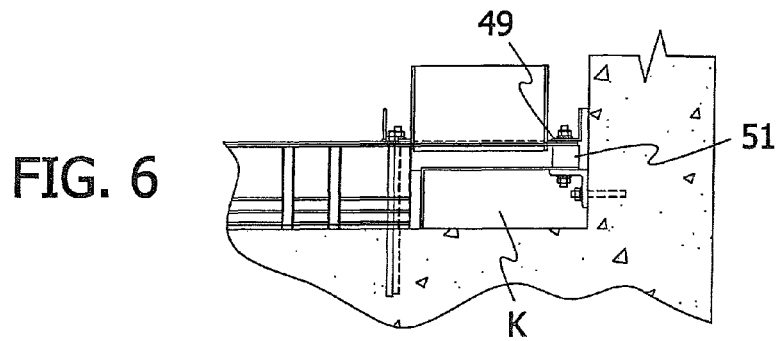
FIG. 6 is a fragmentary cross-section view taken along lines C-C in FIG. 5.
Figure 7:
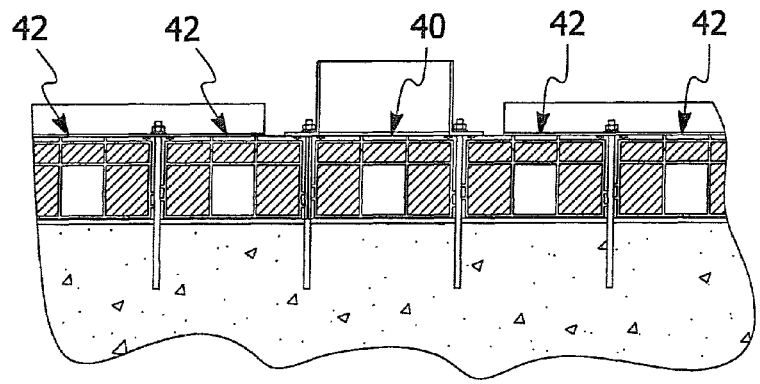
FIG. 7 is a fragmentary cross-section view taken along lines D-D in FIG. 5

FIGS. 5 to 13 illustrate a filter system similar to that disclosed in FIGS. 1 to 4. Hence only the differences will be described in detail. The first difference is that washing gas flume K is not recessed into the bottom of the filter compartment. Rather, the top wall and the left vertical wall (as seen in FIG. 5) of flume K is formed by the underdrain laterals. Specifically, two different types of underdrain laterals are utilized in this embodiment. Preferably, a single underdrain lateral 40 as illustrated in FIGS. 8 and 9 is utilized in this embodiment. The remaining underdrain laterals utilized in this embodiment are of the form of underdrain lateral 42 illustrated in FIGS. 11 and 12. Underdrain lateral 40 is shorter than underdrain laterals 42 to create a space to receive a washing gas supply conduit 44 and corresponding sealing plate 46. Preferably, end 47 of the sealing plate 46 receives all threads 48. Nuts onto anchors 48 may be used to secure end 47 to the top of the adjacent underdrain laterals. End 49 of sealing plate 46 may be secured to a wall of the filter compartment via anchor and sealing assembly 51 shown in FIG. 6. It will be readily understood that sealing plate may be held in place in a sealed fashion by any suitable means.

Underdrain laterals 42 have a cut-out area 52 that serves to form a portion of flume K, i.e., the left vertical wall and top wall of flume K as seen in FIG. 5. Underdrain laterals 40 and 42 have a similar internal construction to underdrain laterals 4, i.e., each have three upper chambers and three lower chambers. As seen in FIGS. 9 and 12, the end of each underdrain lateral 40 and 42 is configured such that only the lower central chamber 54 is in direct fluid communication with flume K. During a washing cycle, preferably the only washing fluid conveyed by flume K is a washing gas. As the washing gas travels from the flume K into the underdrain laterals 40 and 42, the washing gas migrates into the three upper chambers of the underdrain laterals and subsequently into the filter bed. It should be noted that a washing liquid only flume (i.e., the only washing fluid directed through the flume is a washing liquid) similar to flume I may be utilized. Alternatively, a washing liquid only flume could be formed adjacent the other ends of laterals 40 and 42 in a similar fashion to flume K. in this instanaces each of the underdrain laterals 2 receive a washing gas from flume K adjacent one end of the corresponding lateral without the washing gas previously passing through any other lateral and a washing liquid from the liquid only flume adjacent the other end of the corresponding lateral without the washing liquid previously passing through any other lateral Further, in this instance the bottom or lowermost surface of washing gas flume K is horizontally aligned with the bottom or lowermost surface of the liquid only flume as both the washing gas flume K and the liquid only flume are not recessed in the floor of the filter compartment and the uppermost portion of the washing gas flume K is horizontally aligned with an uppermost portion of the liquid only flume.

Figure 14:
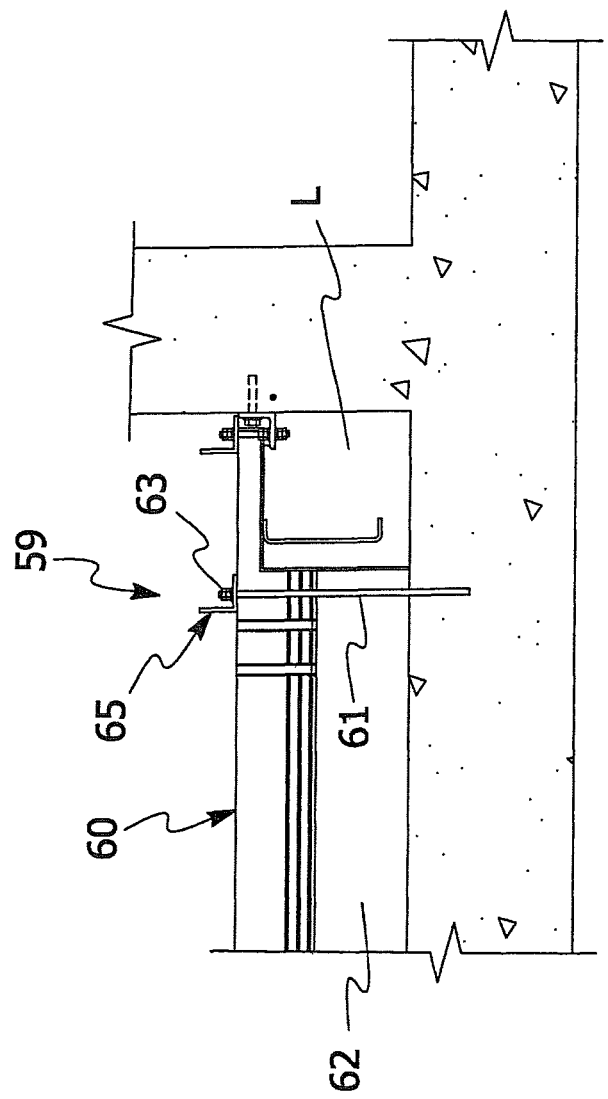
FIG. 14 is a fragmentary cross-sectional view of a filter system depicting a further preferred embodiment of the present invention.

FIGS. 14 Through 16

The filter system illustrated in FIGS. 14 to 16 is similar to that illustrated in FIGS. 5 to 13. Hence, only the differences will be described in detail. In this embodiment, the underdrain laterals 60 are disposed on a layer of grout 62 or other suitable material to increase the volume of flume L. The underdrain laterals are held in place through an anchor assembly 59 including a plurality of all threads 61 (only one of which is shown) extending vertically between adjacent underdrain laterals, nuts 63 and an L shaped hold down 65 extending along the upper surface of the underdrains.

Referring to FIGS. 14 and 15, a plurality of sealing plates 64 serve to seal the top and upper portion of the left side wall of flume L as seen in FIG. 14. One sealing plate 64 is associated with each underdrain lateral. Face 66 of each sealing plate 64 has a central opening of substantially the same size and same shape as the central lower chamber of underdrain lateral 42 so that the washing gas passes from flume K and enters the under laterals 60 only through this central lower chamber of the underdrain lateral. A baffle 68 extending into the page as illustrated in FIG. 14 is secured to sealing plates 64 via nuts and bolts or other suitable fasteners. The baffle 68 causes any residual liquid and the washing gas to pass under the baffle to exit flume L. This configuration expedites the evacuation of the residual liquid from flume L. Preferably, the baffle 68 is one long piece of material that extends substantially the entire length of the ends of all of the underdrain laterals 60. However, other configurations are possible including forming the baffle from multiple segments.

FIG. 16 illustrates one of many possible different configurations for the sealing plate. In this embodiment, sealing plate 70 is solvent welded to the corresponding underdrain lateral. Similarly, baffle 72 is solvent welded to sealing plates 70.

FIG. 17

Figure 17:
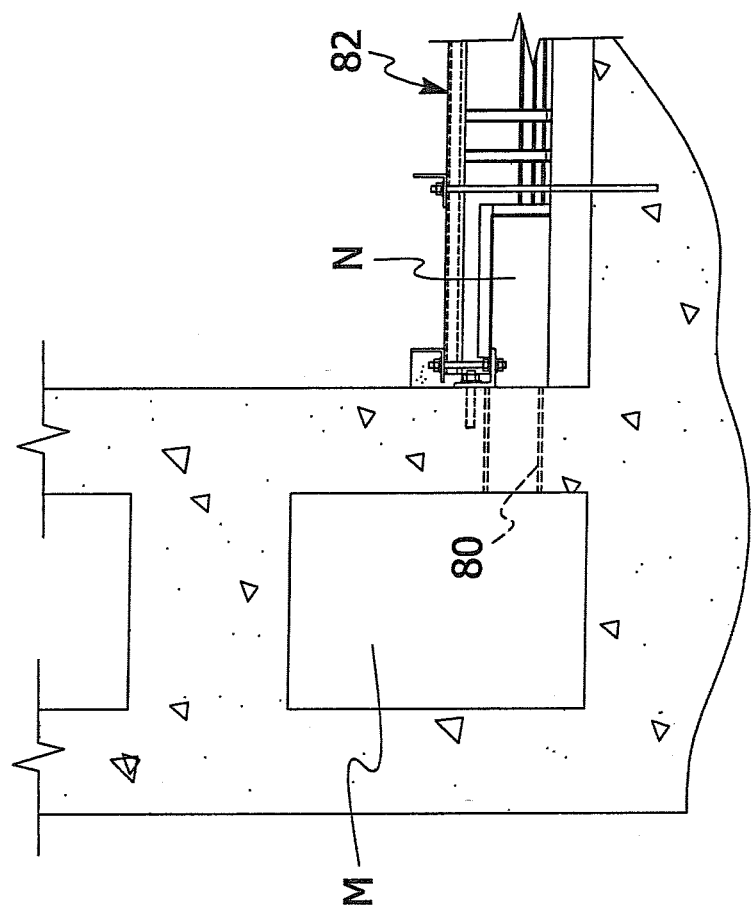
FIG. 17 is a fragmentary cross-sectional view of a filter system depicting a still further preferred embodiment of the present invention.

Referring to FIG. 17, the filter system includes a washing gas only flume M (i.e., the only washing fluid directed through flume M is a washing gas). Flume M is connected to a washing gas only sub-flume N through a conduit 80. Sub-flume N is formed in a manner similar to flume K. It should be noted that the only type of underdrain lateral 82 utilized in this embodiment has the same configuration as underdrain lateral 42.

Figure 18:
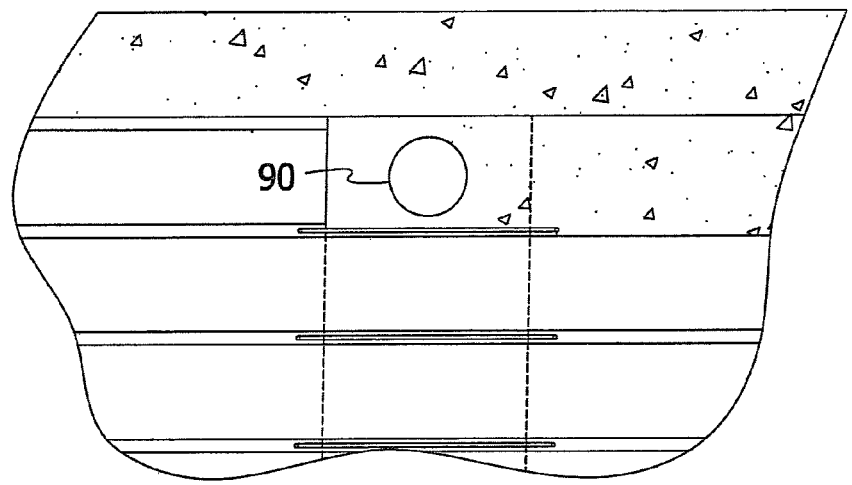
FIG. 18 is a fragmentary plan view of a filter system depicting yet a further preferred embodiment of the present invention.
Figure 19:
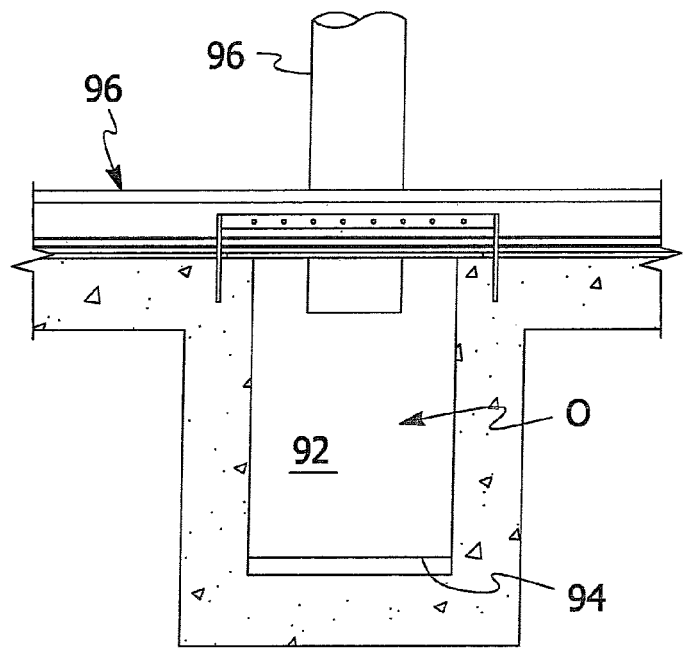
FIG. 19 is a fragmentary cross-sectional view taken through the flume of the embodiment depicted in FIG. 18.

FIGS. 18 Through 19

FIGS. 18 and 19 illustrate a simple method to convert a preexisting washing liquid flume to a washing gas only flume. A gas supply pipe 90 is added to supply a washing gas to flume O. A cover plate 92 is placed over the entrance of preexisting flume O to substantially seal the entrance of flume O while providing an opening 94 adjacent the bottom of flume O. During a washing cycle, a washing gas entering flume O will cause some residual liquid in flume O to exit through opening 94 without passing through the filter bed disposed above underdrain laterals 96. In this embodiment, it is necessary to establish a washing gas and residual liquid interface that is above the opening 94, i.e., in this embodiment some residual liquid must remain in flume O to prevent the washing gas from escaping through opening 94.

Figure 20:
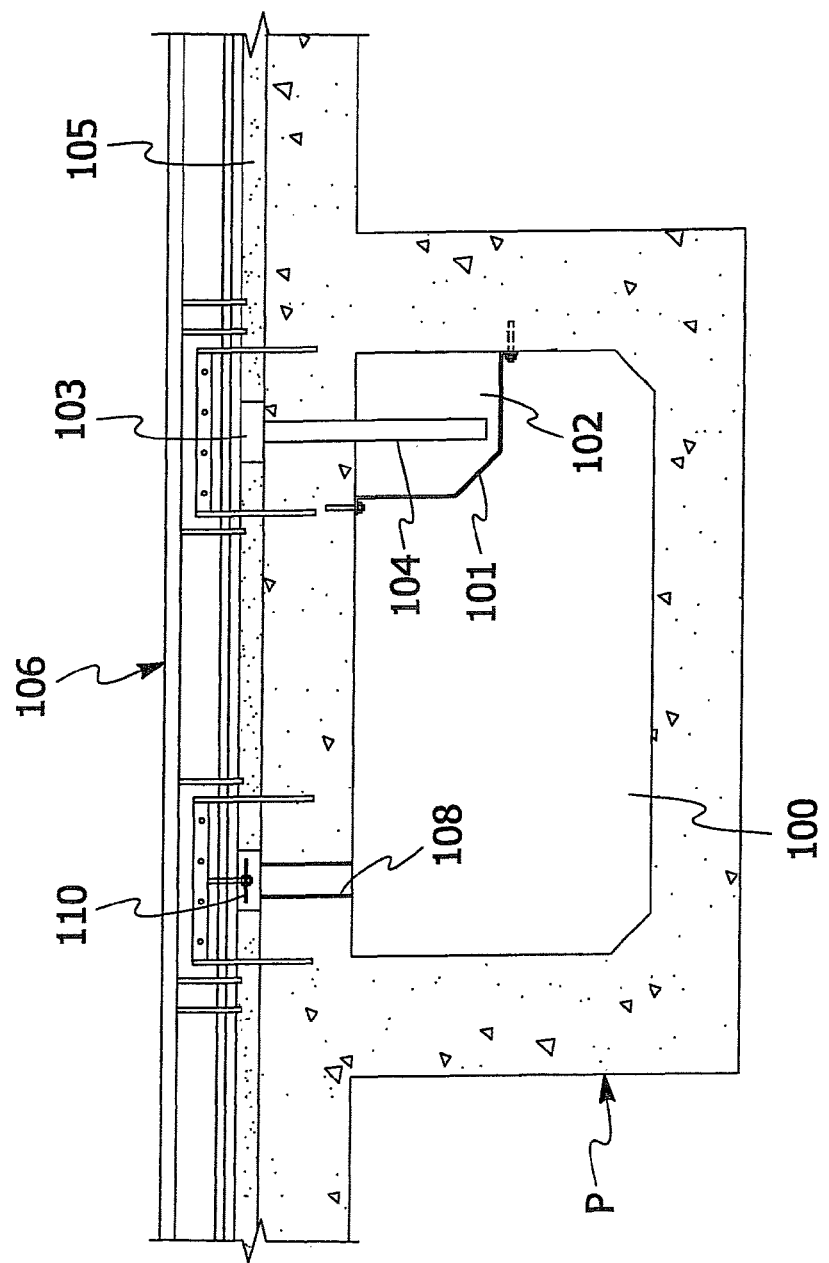
FIG. 20 is a fragmentary cross-sectional view of a filter system depicting yet still a further preferred embodiment of the present invention.
Figure 21:
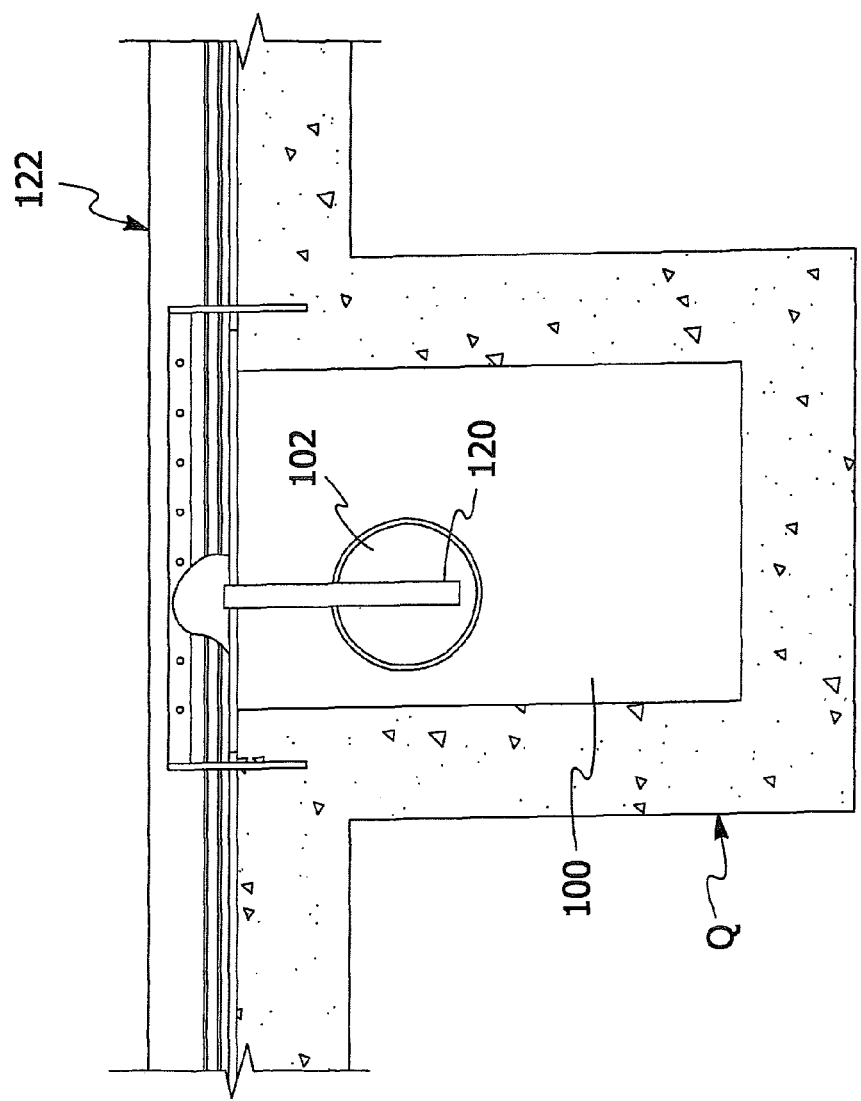
FIG. 21 is a fragmentary cross-sectional view of a filter system depicting still another preferred embodiment of the present invention.

FIGS. 20 and 21

The filter systems illustrated in FIGS. 20 and 21 include flumes P and Q, respectively. These flumes are similar in design as they each include a washing liquid compartment 100 and a washing gas compartment 102. In the case of flume P, the washing gas compartment is formed by a substantially L shaped enclosure 101 secured to the top and sidewall of the flume P. The washing gas compartment is sealed so that a washing gas and washing liquid interface is not present in flume P, i.e., the washing gas cannot act on the washing liquid to reduce the volume of the washing liquid present in flume P. A plurality of conduits 104 extend into the lower portion of compartment 102 so that any residual liquid remaining in compartment 102 from a prior service run can be quickly and thoroughly be evacuated from compartment 102 in a similar manner to that described in connection with the embodiment illustrated in FIGS. 1 to 4. A sub-flume 103 is formed in grout layer 105 supporting underdrain laterals 106. The underdrain laterals 106 have a configuration similar to that of underdrain laterals 4. In addition, each underdrain lateral 106 each have an opening formed in the bottom thereof that is aligned with the lower central chamber so that washing gas from sub-flume 103 may enter the lower chamber of the underdrain laterals. Conduit 108 and sub-flume 110 connect the washing liquid compartment 100 to the lower exterior chambers of underdrain laterals 106. Openings similar to openings 16 are formed in the bottom of underdrain laterals 106 directly above sub-flume 110 to permit the washing liquid to pass from the sub-flume into the underdrain laterals 106. The sub-flumes 103 and 110 accommodate instances where the conduits 104 and 108 do not directly align with the corresponding openings in the bottom of the underdrain laterals.

In FIG. 21, the washing gas compartment 102 is a gas header pipe. A plurality of conduits 120 extend above the lowermost portion of the gas header pipe up to the bottom of underdrain lateral 122 to permit the quick and thorough evacuation of any residual liquid present in the gas header pipe from a prior service run.

While this invention has been described as having a preferred design, it is understood that the preferred design can be further modified or adapted following in general the principles of the invention and including but not limited to such departures from the present invention as come within the known or customary practice in the art to which the invention pertains. The claims are not limited to the preferred embodiment and have been written to preclude such a narrow construction using the principles of claim differentiation.

We claim:

1. A filter system having a filter bed for filtering water or wastewater, where the filter bed is periodically washed between service runs by directing washing fluids upwardly through the filter bed, said filter system comprising:
   (a) a filter bed;
   (b) a plurality of underdrain laterals disposed below the filter bed, each of the plurality of underdrain laterals having a first end and a second end, each of the plurality of underdrain laterals being configured to receive a first washing fluid adjacent the first end and direct the first washing fluid upwardly to the filter bed, each of the plurality of underdrain laterals being configured to receive a second washing fluid adjacent the second end and direct the second washing fluid upwardly to the filter bed, the first washing fluid being different from the second washing fluid, each of the plurality of underdrain laterals are configured to receive the first washing fluid adjacent the first end without the first washing fluid previously passing through any other underdrain lateral, each of the plurality of underdrain laterals are configured to receive the second washing fluid adjacent the second end without the second washing fluid previously passing through any other underdrain lateral;
   (c) a first flume including a supply conduit for fluid communication with a source of the first fluid, the first flume being configured such that during washing of the filter bed between service runs the first flume receives the first washing fluid and directs the first washing fluid into the first end of each of the underdrain laterals the first flume being disposed adjacent the first end of each of said plurality of underdrain laterals, a first portion of each of the plurality of underdrain laterals forming an upper wall of the first flume, a second portion of each of the plurality of underdrain laterals forming a sidewall of the first flume;
   (d) a second flume including a supply conduit for fluid communication with a source of the second fluid, the second flume being spaced from the first flume, the second flume being configured such that during washing said second flume receives the second washing fluid and directs the second washing fluid into the second end of the plurality of underdrain laterals wherein a bottom wall of the second flume is aligned horizontally with a bottom wall of the first flume.

2. A filter system, as set forth in claim 1, wherein: (a) the first washing fluid is a gas.

3. A filter system, as set forth in claim 1, wherein: (a) the second washing fluid is a liquid.

4. A filter system, as set forth in claim 1, further including: (a) a filter compartment housing the filter bed, the filter compartment having a substantially planar floor, the first flume being disposed relative to the substantially planar floor such that no portion of the first flume extends below the substantially planar floor.

5. A filter system as set forth in claim 1, wherein: (a) the first flume is a washing gas only flume as during washing only a washing gas is directed into the first flume and the only liquid that may be in the first flume during washing is residual liquid that may be present in the first flume from a prior service run.

6. A filter system as set forth in claim 1, wherein: (a) the second flume is a washing liquid only flume as the only washing fluid directed into the second flume during washing is a liquid.

7. A filter system as set forth in claim 1, wherein: (a) each of the plurality of underdrains includes a first chamber, a second chamber and a-third chamber, at least a portion of the first chamber, the second chamber and the third chamber of each of the plurality of underdrains are aligned horizontally.

8. A filter system as set forth in claim 7, wherein: (a) each of the plurality of underdrain laterals are configured such that when the filter bed is simultaneously washed with the first washing fluid and the second washing fluid, the first washing liquid and the second washing liquid will simultaneously be present in at least the first chamber and the second chamber.

9. A filter system having a filter bed for filtering water or wastewater, where the filter bed is periodically washed between service runs by directing washing fluids upwardly through the filter bed, the filter system comprising:
(a) a filter bed;
(b) a plurality of underdrain laterals disposed below the filter bed, each of the underdrain laterals having a first end and a second end, each of the underdrain laterals being configured to receive a first washing fluid and direct the first washing fluid upwardly to the filter bed and each of the underdrain laterals being configured to receive a second washing fluid and direct the second washing fluid upwardly to the filter bed, the first washing fluid being different from the second washing fluid, each of the plurality of underdrain laterals having a first chamber and a second chamber; and,
(c) a first flume including a supply conduit for fluid communication with a source of the first fluid, the first flume being configured such that during washing of the filter bed between service runs the first flume receives the first washing fluid and directs the first washing fluid into the first end of the plurality of underdrain laterals, the plurality of underdrain laterals being configured to receive the fluid simultaneously in the first chamber and the second chamber such that the first washing fluid enters the first chamber without passing through the second chamber and the first washing fluid enters the second chamber without passing through the first chamber, each of the plurality of underdrain laterals being configured to direct the first washing fluid into the filter bed to assist in cleaning the filter bed between service runs, the first flume being disposed adjacent the first end of each of the plurality of underdrain laterals, the first flume having a bottom; and, a first portion of each of the plurality of underdrain laterals forming an upper wall of the first flume; and,
(d) a second flume including a supply conduit for fluid communication with a source of the second fluid, the second flume being spaced from the first flume and having a bottom, the second flume being configured such that during washing said second flume receives the second washing fluid and directs the second washing fluid into the second end of the plurality of underdrain laterals, wherein the bottom of the second flume is horizontally aligned with the bottom of the first flume.

10. A filter system as set forth in claim 9, wherein: (a) each of the first chamber and second chamber extend substantially horizontally.

11. A filter system as set forth in claim 9, wherein: (a) the first flume is a washing gas only flume as the only washing fluid directed into the first flume during washing is a gas and the only liquid that may be in said first flume during washing is residual liquid that may be present in said first flume from a prior service run.

12. A filter system as set forth in claim 11, wherein: (a) the second flume is a washing liquid only flume as the only washing fluid directed into the second flume during washing is a liquid.

13. A filter system having a filter bed for filtering water or wastewater, where the filter bed is periodically washed between service runs by directing washing fluids upwardly through the filter bed, the filter system comprising:
(a) a filter bed;
(b) a plurality of underdrain laterals disposed below the filter bed, each of the underdrain laterals having a first end and a second end, each of the underdrain laterals being configured to receive a first washing fluid and direct the first washing fluid upwardly to the filter bed and each of the underdrain laterals being configured to receive a second washing fluid and direct the second washing fluid upwardly to the filter bed, the first washing fluid being different from the second washing fluid, each of the plurality of underdrain laterals having a first chamber and a second chamber, said first chamber being disposed relative to said second chamber such that a lower portion of said first chamber is aligned horizontally with a lower portion of said second chamber; and,
(c) a first flume including a supply conduit for fluid communication with a source of the first fluid, the first flume being configured such that during washing of the filter bed between service runs the first flume receives the first washing fluid and directs the first washing fluid into the first end of the plurality of underdrain laterals, the plurality of underdrain laterals being configured to direct the first fluid simultaneously into the first chamber and the second chamber such that the first washing fluid enters the first chamber without passing through the second chamber and the first washing fluid enters the second chamber without passing through the first chamber, the plurality of underdrain laterals being configured to direct the first washing fluid into the filter bed to assist in cleaning the filter bed between service runs, the first flume being disposed adjacent the first end of each of the plurality of underdrain laterals, a first portion of each of the plurality of underdrain laterals forming an upper wall of the first flume; and,
(d) a second flume including a supply conduit for fluid communication with a source of the second fluid, the second flume being spaced from the first flume, the second flume being configured such that during washing said second flume receives the second washing fluid and directs the second washing fluid into the second end of the plurality of underdrain laterals, wherein a lowermost portion of the second flume is horizontally aligned with a lowermost portion of the first flume and an uppermost portion of the second flume is horizontally aligned with an uppermost portion of the first flume.

14. A filter system as set forth in claim 13, wherein: (a) a first wall forms an uppermost portion of said first chamber and an uppermost portion of said second chamber.

15. A filter system as set forth in claim 14, wherein: (a) said first wall extends substantially horizontal.

16. A filter system as set forth in claim 15, wherein: (a) each of said plurality of underdrain laterals includes two sidewalls and two interior walls, said two interior walls includes a first interior wall that extends from a lowermost portion to an uppermost portion of said first chamber.

17. A filter system as set forth in claim 16, wherein: (a) said two interior walls further includes a second interior wall that extends from a lowermost portion to an uppermost portion of said second chamber.

18. A filter system as set forth in claim 17, wherein: (a) each of the plurality of underdrain laterals include a third chamber disposed between said first chamber and said second chamber, a first portion of said third chamber is aligned horizontally with a lowermost portion of said first chamber and a lowermost portion of said second chamber.

\* \* \* \* \*

UNITED STATES PATENT AND TRADEMARK OFFICE
CERTIFICATE OF CORRECTION

PATENT NO. : 8,992,774 B2  Page 1 of 1
APPLICATION NO. : 13/679112
DATED : March 31, 2015
INVENTOR(S) : R. Lee Roberts et al.

It is certified that error appears in the above-identified patent and that said Letters Patent is hereby corrected as shown below:

In the specification
Column 1, line 13, the phrase "filed are" now reads -- are --.
Column 5, line 30, "FIG. 12" now reads -- FIG. 11 --.
Column 8, lines 28 to 29, the phrase "in this instanaces" now reads -- In this instance --.
Column 9, line 54, the phrase "thoroughly be evacuated" now reads -- thoroughly evacuated --.
Column 9, line 59, the phrase "each have" now reads -- have --.
In the claims
Claim 1, column 10, line 50, the phrase "the underdrain laterals the first flume" now reads -- the underdrain laterals, the first flume --.
Claim 7, column 11, line 21, the phrase "a-third chamber" now reads -- a third chamber --.

Signed and Sealed this
Third Day of May, 2016

Michelle K. Lee
*Director of the United States Patent and Trademark Office*